UNITED STATES PATENT OFFICE.

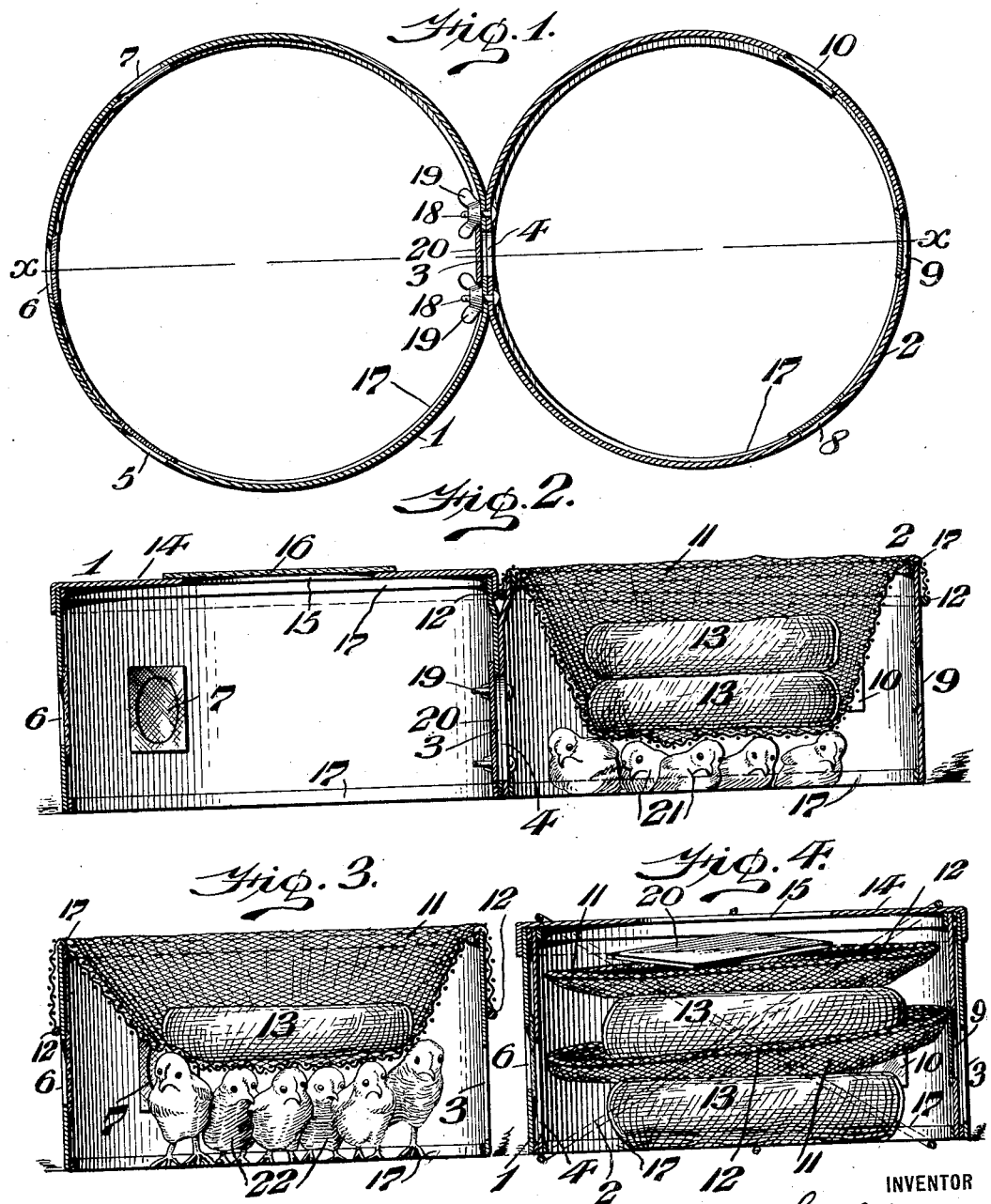

ROBERT C. B. LETHBRIDGE, OF PORT KENNEDY, PENNSYLVANIA.

FIRELESS BROODER.

1,108,917.        Specification of Letters Patent.        Patented Sept. 1, 1914.

Application filed March 13, 1913. Serial No. 753,939.

*To all whom it may concern:*

Be it known that I, ROBERT C. B. LETHBRIDGE, a subject of the King of Great Britain, residing at Port Kennedy, in the county of Montgomery, State of Pennsylvania, have invented a new and useful Fireless Brooder, of which the following is a specification.

In the rearing of chickens, the care of the newly hatched young is a matter of great importance, and of considerable difficulty. The chicken by nature seeks to maintain its warmth by crowding with others of its kind. This is a necessary instinct for the preservation of the chicken, but it results in the destruction of the weaker, as the younger or less developed are trampled and smothered by the more robust, which action has been particularly noticed in brooding constructions which have corners or sharp angles therein, since the chickens naturally seek a corner, and in the huddling in the angle of the wall, the greatest danger exists. The temperature of the chicken is naturally high, and there is great danger in exposing the young, in view of this, and in view of the sustained temperature of the incubator during the actual hatching. It is therefore necessary that the young chicks be kept warm, and that their exposure to ordinary temperatures be gradually effected and without sudden change. As the ordinary brooder for keeping the newly hatched chicks from sudden chill has usually been a bulky structure, and as the brooder is only used for a comparatively short period during the rearing of the chicks, and as chickens are usually reared at only certain seasons of the year, there has resulted a crowding of the chickens or in a limitation of the period of brooding, either or both of which have resulted in a high rate of mortality, and a considerable loss on this account, and in order to obviate the foregoing objections, I have produced a simple and inexpensive fireless brooder, capable of snug stowage and available at a price which will afford ample accommodation for all of the chickens successfully incubated.

My novel invention consists of two separate circular hovers, preferably made of very tough fiber or other material, which can be readily cleaned and used, an indefinite number of times, said hovers being identical except in size, one for ease in shipping being made slightly smaller than the other so as to pack inside it, each hover being provided with a circular or other door-way and preferably three windows covered with transparent, non-conducting material equally dividing the semi-circle farthest from the door-way.

My invention further consists in providing each hover with a movable, circular cover, which is suitably formed so as to be stretched at any desired height above the chicks' heads or touching them, one or more suitably filled cushions being provided which may be used on one hover during the first week, as the temperature demands, and later one on each hover.

My invention further consists of a plurality of hovers adapted to be placed in juxtaposition, and to be temporarily so retained by means of suitable fastening devices such as thumb screws, bolts and nuts joining the hovers at door-ways common thereto, said fastening devices serving as a support for a movable door of card-board, stout paper or similar material, capable of ready adjustment when it is desired to confine the chicks in either half of the brooder.

To the above ends, my invention consists of a novel construction of fireless brooder, comprising a plurality of sections adapted to be used singly or in unison, means being provided for enabling the hover members to be readily assembled and disconnected, and to be readily telescoped with respect to each other, for shipping or storage purposes.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized, and that my invention is not limited to the precise arrangement and organization of these instrumentalities as herein shown and described.

Figure 1 represents a horizontal sectional view of a fireless brooder, embodying my invention, showing the covers therefor removed. Fig. 2 represents a section on line *x—x* Fig. 1, the right hand portion thereof showing the brooder in operation. Fig. 3 represents a sectional view similar to the right hand portion of Fig. 2, showing the brooder in use when the chicks have increased a little in age. Fig. 4 represents a side elevation, showing the manner of assembling the parts for storage or shipment.

Similar numerals of reference indicate corresponding parts in the figures.

Referring to the drawings:—My novel construction of brooder comprises two separate circular hovers, 1 and 2, which in practice I prefer to make of some very tough fiber or suitable material, which can be readily cleaned and repeatedly used. The two hovers are substantially identical, except in size, one hover, as the member 1, for ease in shipping, being made a fraction of an inch smaller than the hover 2, so as to readily pack inside it, as will be understood from Fig. 4. Each hover is provided with a circular or other shaped doorway, 3 and 4, preferably about four inches in diameter, and located substantially as will be understood from Figs. 1 and 2, each hover also having a plurality of circular or other shaped windows as 5, 6 and 7, seen in the the hover 1, and 8, 9 and 10, seen in the hover 2, said windows being covered with transparent, non-conducting material and preferably equally dividing the semi-circles farthest from the doorways 3 and 4.

In practice, I make the depth of the hovers about seven and one-half inches and the diameter about sixteen inches. Each hover is provided with a removable or adjustable circular cover 11 of cheesecloth or other similar material, which I preferably make about twenty four inches in diameter when fully stretched. This cover is bound at its edges with an elastic 12, or other suitable means, so that the cover may be stretched or located at any desired height above the chicks' backs or touching them, the central portion of said cover 11 sagging inwardly, as will be understood from Figs. 2 and 3, thereby forming a pocket for the reception of one or more feather filled cushions 13, which in practice, I make preferably about fourteen inches in diameter, one or both of which cushions may be used on one hover during the first week, as the temperature demands, and later, one on each hover, according to requirements.

Each brooder is provided with a fiber lid 14, having a circular or other shaped sky light 15 cut therein to admit overhead light, in addition to the side windows 5, 6, 7, 8, 9 and 10 hereinbefore referred to. The sky light opening 15 may be partly or wholly covered with a loose pane of glass or the like 16.

In practice, I make the bottom edge of both door-ways 3 and 4, and windows 5, 6, etc., about two inches from the ground, the hovers having no bottom floors (other than their base portions 17,) and standing directly on the ground.

In order to temporarily secure the hovers in assembled position, as seen in Figs. 1 and 2, I provide one of the hovers, as 2, with a pair of fastening devices or threaded stems, as 18, upon which are mounted the thumb nuts 19, so that the two hovers may be joined at the door-ways, when desired, as will be understood from Figs. 1 and 2, as, for example, during the first week of the life of the chicks. The wings of the thumb screws can be turned so as to stand horizontal, as indicated in Fig. 1, and thus provide support for a removable partition or door 20 or card-board or stout paper or other material, which can be readily slid up and down or adjusted, if desired, to confine the chicks in either half of the brooder.

21 designates the chicks as they may appear during their first few days of life, and 22 represents the same when a little older, as seen in Fig. 3.

The operation of the brooder is as follows:—During the first few days after the chicks are hatched, the two hovers are used together, being joined at the door-ways by the thumb nuts and bolts, as will be understood from Figs. 1 and 2. One hover as 1 is used as a yard for feeding and exercise, and is covered during cold weather, with the apertured lid 14 and the glass sky light 16, as seen at the left of Fig. 2. The other hover as 2, seen at the right of Fig. 2, is filled to a depth of say two inches with a suitable litter, and used as the hover proper. The cover of cheese-cloth or other material can be placed in position, as indicated at the right of Fig. 2, and can be raised or lowered at will by simply stretching the elastic 12 over the edge of the hover, and the filled cushion 13 can then be placed in position, as seen in Fig. 2, it being understood that while, ordinarily, one cushion is sufficient, two cushions are provided for use in extremely cold weather, as during the first week of the life of the chicks.

It will be understood that in operation, during the first week, about fifty chicks are placed in the double hover, as seen in Fig. 2, one hover being used as a yard. After the first week, or sooner, in the case of warm or seasonable weather, the chicks will need more room in the hover, and it will no longer be necessary to confine them in so small a place as the yard provided. The two portions of the brooder, as 1 and 2, are then taken apart by moving the thumb nuts 19, and the hover 1, which has so far been the yard, is transformed into a second hover, for which a separate cover and feather cushion are provided. The brood is then divided into two halves, twenty-five chicks being placed in each hover and the two broods being now kept in separate pens or coops. After the second or subsequent weeks, the chicks will be old enough to be given the full run of the pen, coop or house where they are to be kept. The cover 11 and the cushion 13 can be raised as the chicks grow, by adjusting the elastic band 12, as will be understood from Fig. 3, so as to accommodate the increased height of the chicks, as will be understood from Fig. 3, and as the chicks grow older, the cushion 13 can be eventually removed altogether.

The advantages obtained by my novel construction of brooder will now be apparent, since it will be seen that I can employ the two sections of the brooder, as 1 and 2, by the manipulation of the door 20, so that the hover 1 may be employed as a yard, and a shelter for the chickens, while the hover 2 is employed in conjunction therewith. Both the actual hover, as well as the section used as a yard, are abundantly lighted, which light thus admitted not only enables the chicks to find the water and feed on the first day, but also induces them to return into the brooder or the hover proper on the following days when they become able to temporarily leave it, thus saving the time and trouble of putting them back into the brooder from time to time, the light also killing the bacteria germs.

Chicks by nature are not inclined to seek dark places or to run into small holes to hover. When being reared naturally by hens, they may be seen on the coldest days with their heads sticking out toward the light from under the hen's wings or feathers, and one of the draw-backs of fireless brooders has hitherto been the difficulty of "hover breaking" the chicks during the first few days of their life, the very time when they are most liable to become chilled by staying outside the hover. The principal cause of mortality among fireless brooder chicks is chilling, not chilling in the hover itself, since a brood of from twenty-five to fifty chicks in a good fireless brooder will generate enough warmth to keep them from chilling so long as they remain in the hover, but they are liable to become chilled when they are allowed out in the yard to feed, because they cannot be induced to quickly run back and warm up again, as they would do with the mother hen, and my invention eliminates the risk of this chilling in three ways:—First, the hover being comfortable, cornerless, and well lighted, the chicks will run back into it freely from the first day that they are allowed out; second, if any chicks remain out in the yard hover, as the left hand hover seen in Fig. 2, the solid walls and lid prevent any outside cold drafts from touching them, for the lid in cold weather being within about seven inches of the ground, the body warmth of the chicks will be retained in the yard as well as in the hover; third, a point which aggravates the risk of chilling in the yard is sweating in the hover. Chicks may sweat in a dark, windowless hover from the cover being too low on them, and the attendant cannot see this without removing the cover, and thereby letting in cold air. With my novel construction, the attendant can regulate the height of the cover exactly, by simply looking through the windows and moving the cover and its cushion up and down, according to requirements. Sweating chicks running out into a yard which is not warm, are invariably liable to get chilled, and a chilled chick seldom lives. It will furthermore be apparent that by my invention, the attendant can see by day or night exactly how his chicks are doing in the hover, without removing the cover. If he sees that the chicks are crowding and burrowing under one another from insufficient warmth, he can lower the cover 11 and the cushion 13 until they are comfortable, and if he sees them trampling on each other or gasping from too much warmth, he can just as easily raise the cover a little, according to requirements. The light admitted to the hover by the three windows and doorway enables the attendant to study the comfort of the chicks with perfect ease, without having to lift the cover or handle the chicks. It will further be apparent that there are no corners either in the hover proper of the brooder, as the member 2, or in the yard section, as the member 1, where the chicks can crowd. There is, furthermore, no need in my brooder to pull the hover apart to alter the diameter as the chicks increase in size, thereby altering the appearance of the hover, and making the chicks shy of entering what looks to them like a new hovering place.

In the practical use of my invention, fifty chicks are put into the double contrivance-hover and yard—as seen in Fig. 2, and they are kept there until growth demands first, that the flock be decreased in size, and, second, that the chicks have more room. When this period arrives, at about a week in cold weather and less in warm weather, the yard section, as 1, as seen in Fig. 2, can be readily unscrewed from the hover and transformed into a second hover for half the original brood of fifty, twenty-five chicks being then contained in each member of the brooder.

I desire to call special attention to the ample provision I have made for the ventilation of my device, since it will be noticed that the cushions are not as large in diameter as the hover, so as to enable a free passage of air around the outer edge of the hover, and I have found in practice this amount of ventilation to be perfectly satisfactory. The chicks can always be noticed brooding under the sagging part of the cover with their heads pointing outward, when they are comfortable. When they are too hot, they are more toward the outside, where the cover is higher off their backs, an indication that the cover should be raised slightly until they go back to the middle again. Conversely, if the chicks are seen with their heads pointing inward, and struggling to get to the center, it means that the cover is too high, and should be lowered on their backs. That the ventilation is right is shown by the absence of any smell when the cover is removed to arrange the bedding in the morning. I also desire to call attention to the economy obtained by my construction, since my brooder when assembled, as seen in Fig. 2, is one complete unit for chicks up to a week old with a feeding and exercising yard attached. At the age when the growth of the chicks would make it necessary to purchase a second hover, the chicks no longer require so small a yard, as the one provided, but are old enough to have free range around their hover. It is then that the second hover, as the member 1, gives up its function as a yard, and becomes itself the needed second hover.

When not in use, or when prepared for storage or shipment, the sections 1 and 2 are assembled, as shown in Fig. 4, and the cushions 13 and covers 11 are readily assembled, as will be understood, thus making it possible to store, pack or ship the device with great ease and with little expense, and at the same time, the brooder may be set up and adjusted at a minute's notice.

Attention is particularly directed to the fact that the hovers are formed without any bottom, and can be set upon the ground at any point. In order to clean the hover, it is only necessary to lift up the same, after which the ground can be brushed or any dirt removed, in an easy and convenient manner, and the hover again placed upon the ground, or the hover can be moved from place to place, as desired, thus affording a clean surface as may be necessary for the chicks.

I preferably desire to provide strengthening braces, such as strips or straps 17 at suitable points around the interior of the side walls, which serve to hold the hovers in shape, as will be evident. The lower strip is preferably situated at such a point that, as will be clearly seen from Fig. 2, it serves as a rest or support for the door 20, when the latter is in closed position. Any suitable means for holding the parts in assembled position for storage or shipment may be provided; as shown in Fig. 4, in which I have shown a cord or string passed around the device for this purpose.

It will now be apparent that I have devised a novel and useful construction of a fireless brooder, which embodies the features of advantage enumerated as desirable in the statement of the invention and the above description, and while I have shown and described, in the present instance, a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A hover consisting of an upwardly extending side wall, a flexible cover supported on the upper edge of said side wall with its edge extending downwardly on the outside of said wall and having its central portion flexibly sagging within said hover to form a pocket adapted to support a cushion, and means secured to the edge of said cover and adapted to engage the outer periphery of said wall whereby the depth of said pocket can be varied according to the age and height of the chicks by raising and lowering said securing means on the exterior of said wall.

2. In a device of the character stated, a hover consisting of a circular side wall with an open bottom, said wall having a door on one side and a plurality of windows therein on the opposite side, one of said windows being opposite to said door, and each of said windows having a closure of transparent material, a cover for said hover and adapted to have its central portion flexibly sag within said hover, and a fastening band at the edge of said cover and engaging the exterior of said side wall.

3. In a device of the character stated, a hover consisting of a circular side wall with an open bottom, said wall having a door on one side of a central line and a plurality of windows therein on the opposite side of the said central line, one of said windows being opposite to said door, and another of said windows being on one side of and adjacent to said first mentioned window, a cover for said hover and adapted to have its central portion flexibly sag within said hover, and a fastening band at the edge of said cover and engaging the exterior of said side wall.

4. In a fireless brooder, a plurality of circular hovers of different diameters, whereby one will fit within the other and each hover having an open bottom, means for detachably securing said hovers together with a communication between the same, a flexible cover for one of said hovers having a flexibly sagging central portion, a fastening device in engagement with the edge of said cover for enabling the latter to be adjusted upon its hover, and a cover for the other hover, whereby both hovers are suitably closed and drafts are prevented.

5. In a device of the character stated, a plurality of circular hovers having an annular wall provided with doors, a plurality of fastening devices for holding said hovers in assembled position with said doors in alinement, a removable partition for said doors retained by said fastening devices, an apertured closure for the one of said hovers adapted to serve as a yard, a transparent plate for said closure, each of said hovers being also provided with a plurality of windows, a flexible cover for the other of said hovers, having its central portion sagged within its hover to form a pocket, and a fastener for the edge of said cover in engagement with the exterior of the contiguous hover.

6. In a device of the character stated, a plurality of circular hovers having an annular wall provided with doorways, a plurality of fastening devices for holding said hovers in assembled position with said doorways in alinement, a removable partition for said doors retained by said fastening devices, an apertured closure for one of said hovers adapted to serve as a yard, a transparent plate for said closure, each of said hovers being also provided with a plurality of windows, a flexible cover for the other of said hovers, having its central portion sagged within its hover to form a pocket, and a fastener for the edge of said cover in engagement with the exterior of the contiguous hover, in combination with a cushion supported in said pocket.

ROBERT C. B. LETHBRIDGE.

Witnesses:
C. D. McVay,
F. A. Newton.

Copies of this patent may be obtained for five cents each, by addressing the "Commissioner of Patents, Washington, D. C."